Jan. 5, 1971 E. RICHARDSON 3,552,893
ROTARY CASING ORBITAL GEAR-ROTOR MOTOR
Filed May 7, 1969
2 Sheets-Sheet 1
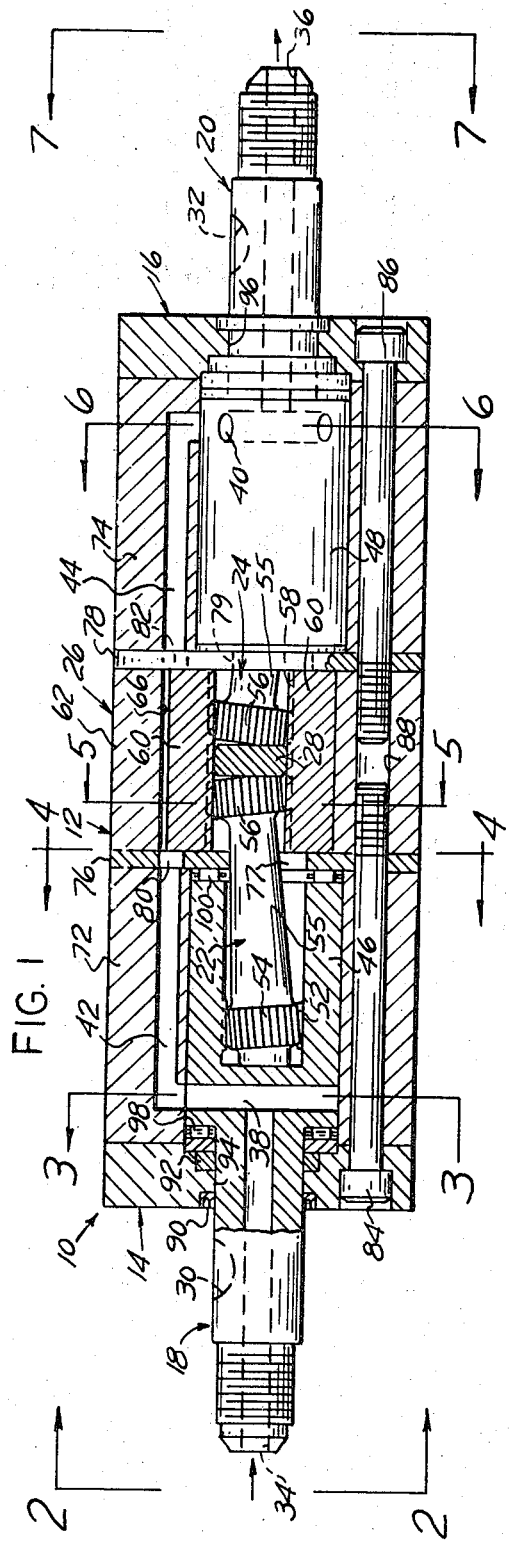
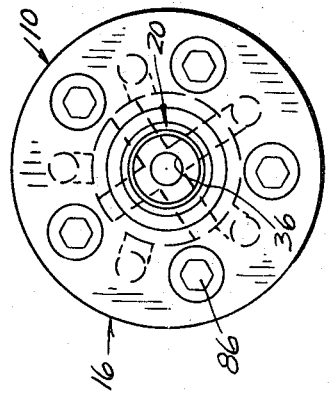
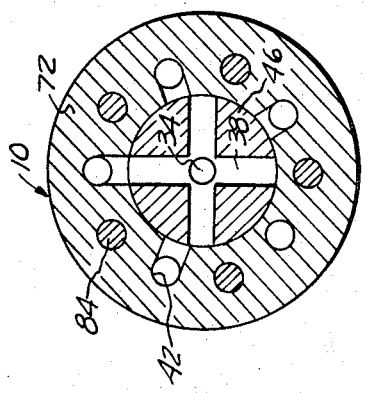
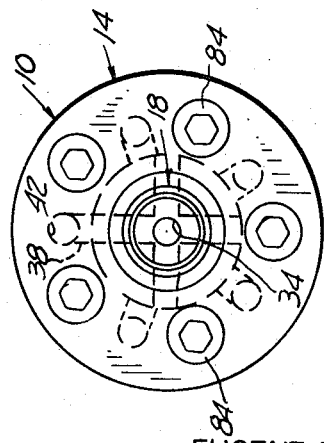
INVENTOR
EUGENE RICHARDSON
BY Barthel & Bugbee
ATTORNEYS

United States Patent Office 3,552,893
Patented Jan. 5, 1971

3,552,893
ROTARY CASING ORBITAL GEAR-ROTOR MOTOR

Eugene Richardson, Southfield, Mich., assignor to Lamina, Inc., Oak Park, Mich., a corporation of Michigan
Filed May 7, 1969, Ser. No. 822,376
Int. Cl. F04c 1/02, 1/06
U.S. Cl. 418—61                                          10 Claims

ABSTRACT OF THE DISCLOSURE

Axially-spaced stationary inlet and outlet shafts are held against rotation and provided with longitudinal inlet and outlet passageways leading to circumferentially-spaced radial fluid inlet and outlet passageways which in turn communicate successively with circumferentially-spaced longitudinal fluid inlet and outlet passageways in axially-spaced rotary fluid-distributing inlet and outlet barrels disposed on opposite sides of and drivingly connected to an internally-toothed outer rotor which meshes with and surrounds an externally-toothed inner stator which is internally-splined and coupled to the stationary shafts by a pair of double-headed externally-splined drive links which oscillate but do not rotate while meshing with internally-splined bores in the stationary shafts. A single drive link may be used in low-torque motors since the two shafts are held against rotation in proper phase relationship by their interconnecting frame structure. Hydraulic pressure fluid is supplied to the stationary inlet shaft and discharged successively through the longitudinal input barrel passageways into the successively expanding and contracting fluid chambers between the teeth of the stator and rotor, thereby imparting rotation to the internally-toothed outer rotor and thence to the remainder of the casing consisting of the two barrels and outer rotor. The casing thereupon becomes a drive pulley capable of driving a belt directly or capable of carrying another driving member, such as a gear, sprocket, cam or wheel. The fluid from the gear-rotor motor thus constituted is discharged through the outlet barrel and hollow outlet shaft. This motor is especially valuable where space is at a premium and extreme compactness is desired and required.

---

In the drawings,

FIG. 1 is a longitudinal section through a rotary-casing orbital gear-rotor motor, according to one form of the invention, FIG. 2 is a left-hand end elevation of the gear-rotor motor of FIG. 1, looking toward the inlet shaft and inlet barrel in the direction of the line 2—2 in FIG. 1;

FIG. 3 is a cross-section through the inlet side of the motor, taken along the line 3—3 in FIG. 1;

FIG. 7 is a right-hand end elevation of the gear-rotor motor of FIG. 1, looking toward the outlet shaft in the direction of the line 7—7 in FIG. 1.

Figure 4:
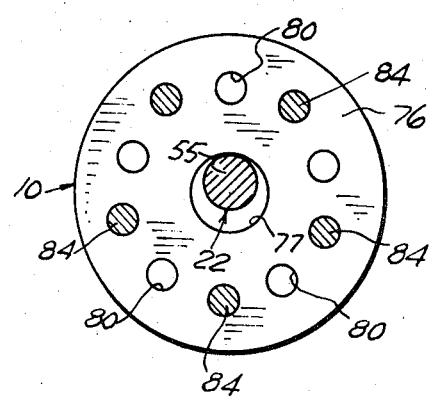
FIG. 4 is a cross-section through the inlet port disc and inlet drive link, taken along the line 4—4 in FIG. 1.

Referring to the drawings in detail, FIG. 1 shows a rotary-casing orbital gear-rotor motor, generally designated 10, according to one form of the invention, as consisting generally of an elongated approximately cylindrical composite rotary casing 12 closed at its opposite ends by inlet and outlet heads 14 and 16 respectively through which enter stationary hollow internally-splined inlet and outlet shafts 18 and 20 respectively for connection through inlet and outlet double-headed externally-splined drive links 22 and 24 respectively to the internally-splined central gear-rotor unit 26. The inner ends of the drive links 22 and 24 are held spaced apart from one another by a spacer disc 28. The construction of the motor 10 is the same on opposite sides of the spacer disc 28 except that the parts face in opposite directions toward the gear-rotor unit 26.

The inlet and outlet shafts 18 and 20 are provided with keyways 30 and 32 respectively which receive keys (not shown) entering keyway grooves in a mounting frame structure (also not shown) which maintain the shafts 18 and 20 in fixed positions relatively to one another without capability of rotation. The inlet and outlet shafts 18 and 20 are provided with longitudinal or axial fluid inlet and outlet passageways 34 and 36 respectively which at their inner ends communicate with radial fluid inlet and outlet passageways 38 and 40 respectively. From FIGS. 3 and 6 it will be seen that the radial inlet and outlet passageways 38 and 40 are four in number and are arranged in a cross-shaped formation but spaced circumferentially 22½ degrees away from one another. The same phase relationship is shown by a comparison of the circumferential position of the dotted lines representing the passageways 38 and 40 in FIGS. 2 and 7.

Figure 5:
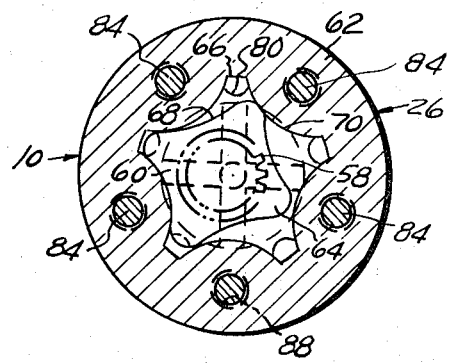
FIG. 5 is a cross-section through the gear-rotor motor, taken along the line 5—5 in FIG. 1.
Figure 6:
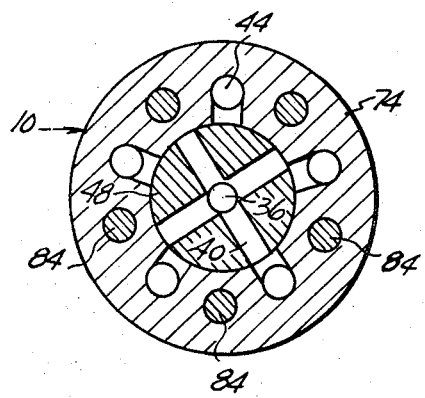
FIG. 6 is a cross-section through the outlet side of the motor, taken along the line 6—6 in FIG. 1.

The radial inlet and outlet passageways 38 and 40 communicate one at a time with the outer ends of one each of five pairs of circumferentially-spaced longitudinal inlet and outlet passageways 42 and 44 (FIGS. 1, 3 and 6). The radial passageways 38 and 40 are formed in enlarged diameter hollow cylindrical portions 46 and 48 respectively on the inner ends of the inlet and outlet shafts 18 and 20 respectively. The enlarged portions 46 and 48 are provided with central blind bores 50, only that of the enlarged portion 46 being shown in FIG. 1, the enlarged portion 48 being in side elevation. Each of the blind bores 50 at its inner end is provided with an annular internally-splined or toothed portion 52 which mesh with externally-splined outer end heads 54 on the drive links 22 and 24. At the inner ends of their shanks 55 these drive links 22 and 24 have externally-splined inner heads 56 which in turn mesh with the internally-splined bore 58 of the inwardly-located stator 60 of the gear-rotor unit 26 which in turn is surrounded by and is disposed eccentric to an external rotor 62. The stator 60 has four external teeth of lobes 64 (FIG. 5) which mesh one at a time with five internal pockets or recesses 66 in the external rotor 62. The teeth 64 of the stator 60 are separated from one another by concave portions 68 whereas the pockets 66 are separated from one another by convex portions 70.

The longitudinal fluid inlet and outlet passageways 42 and 44 are formed within approximately cylindrical inlet and outlet barrels 72 and 74 respectively (FIGS. 1, 3 and 6) which are separated at their inner ends from the gear-rotor unit 26 by port discs 76 and 78 respectively with central holes, 77 and 79 therethrough for the passage of the drive links 22 and 24. The port discs 76 and 78 are of similar construction, hence only one is shown in front elevation, namely in FIG. 4. The port discs 76 and 78 have circumferentially-spaced ports 80 and 82 respectively aligned with the inner heads of the longitudinal passageways 42 and 44. The inlet and outlet heads 14, 16, shafts 18, 20, barrels 72, 74 and port discs 76 and 78 are held in assembly by being drilled in alignment at circumferentially-spaced locations to receive longitudinal tie bolts 84 and 86 (FIG. 1), the inner ends of which are threaded into the opposite ends of threaded bores 88 (FIGS. 1 and 5) in the outer rotor 62 of the gear-rotor unit 26. Each of the shafts 18 and 20 is provided with seals 90 and gaskets 92 in the respective bores 94 and 96 in the heads 14 and 16 and both are provided at the opposite ends of the enlarged portions 46 and 48 with thrust bearings 98 and 100.

It will be evident to persons skilled in the gear-rotor motor art that a greater number of teeth 64 and pockets 66 may be employed in the stator 60 and rotor 62 respectively, but that the stator 60 will always have at least one less tooth than the number of pockets in the rotor 62. It will also be evident to such persons that the motor 10 may be used as a pump by driving the casing 12 containing the outer rotor 62 by a belt, sprocket chain, gearing or the like, whereupon hydraulic fluid will be drawn into one of the longitudinal shaft passageways 34 or 36 and pressure fluid discharged through the other passageway 36 or 34, depending upon the direction of rotation imparted to the casing 12.

It will be additionally evident to such persons that the casing 12 may be held stationary while the shafts 18 and 20 are caused to rotate by supplying pressure fluid to the inlet passageway 34 and discharging fluid from the outlet passageway 36. Such an arangement, however, lacks the advantage of compactness and involves greater difficulty in feeding pressure fluid to the then-rotating shaft 18 and discharging it from the then-rotating shaft 20 without leakage and without somewhat bulky fluid supply and discharge arrangements. As previously stated above, it will also be evident that one of the drive links 22 or 24 may be omitted, provided that the shafts 18 and 20 are maintained stationary in their correct phase relationship of their radial passageways 38 and 40 by the frame structure in which the shafts 18 and 20 are mounted and to which they are keyed as at 30 and 32 or otherwise maintained stationary and in correct phase relationship. FIG. 1, however, shows the use of two drive links 22 and 24 because of their greater torque-transmitting capacity over a single such link.

In the operation of the invention, as a motor 10 with a rotary-casing 12, hydraulic pressure fluid as from a hydraulic pump (not shown), is supplied to the longitudinal fluid inlet passageway 34 in the shaft 18 and flows through the radial inlet passageway 38 which is aligned with only one of the longitudinal inlet passageways 42 at a given instant (FIG. 3), entering through the then-aligned port 80 in the inlet port disc 76 (FIG. 4) to the pocket 66 in the rotor 62 momentarily aligned therewith. The force of the pressure fluid pushes the wall 70 of the pocket 66 so as to rotate the rotor 62 and casing 12 until the pocket 66 at its opposite end uncovers the next succeeding outlet port 82 in the outlet port disc 78, whereupon the fluid flows through the longitudinal passageway 44 in the outlet barrel 74, and through the radial and longitudinal outlet passageways 40 and 36 in the outlet shaft 20 to the hydraulic fluid reservoir (not shown). Meanwhile, the next longitudinal inlet passageway 42 and port 80 have come into communication with the next pocket 66 in the rotor 62, impelling the next adjacent pocket wall 70 to continue rotation of the rotor 62. This action is repeated as each pocket 66 of the rotor 62 receives pressure fluid and rotates the rotor 62 and rotary casing 12, then discharges its fluid into the next succeeding longitudinal outlet passageway 44, and so forth.

The motor 10 finds special advantages and usefulness in constricted locations where it is desired to drive a belt or a chain, such as a conveyor belt or chain, where there would not be room enough to place a motor alongside the drive pulley or sprocket. In the motor 10 of the present invention, the rotary casing 12 itself serves as the pulley or the sprocket hub and all of the working parts are thus housed inside the pulley or sprocket hub with only the ends of the inlet and outlet shafts 18 and 20 projecting therebeyond.

The motor of the present invention is also well adapted for mounting in a fork or yoke as the hub of a traction wheel for individually driving each such wheel of a vehicle. With such a mounting, the fluid conduits are led along the two arms of the fork or yoke to the outer ends of the two stationary shafts of the motor. In such an installation, the complex mechanisms otherwise involved in driving vehicle wheels are replaced by simple hydraulic connections, and the problem of providing a central differential gear box is eliminated.

This motor, while primarily and most powerfully actuated by hydraulic pressure fluid has been successfully operated by pneumatic pressure fluid. While so operated as an air motor, there is of course no necessity of providing a return line for the fluid, as the air discharged from the motor can be discharged directly into the atmosphere.

It will be further evident from FIG. 1 and the sectional views of FIGS. 3, 4 and 5 that the flow of fluid through the motor is substantially straight without abrupt reversals of direction such as occur in conventional gear-rotor motors. Accordingly, there is much less turbulence, foaming and overheating since the straight-through flow from one end of the motor to the other greatly enhances its efficiency and reduces power loss from conversion of power into heat. Where the development of heat does become a problem, it is easily solved by the heat exchanger for cooling the oil or other hydraulic working fluid, because of the fact that such oil is not trapped within the motor to oscillate to and fro, as in such conventional gear-rotor motors, but slows through the motor from one end to the other without reversing its path of flow.

I claim:
1. An orbital gear-rotor motor, comprising
    an internally-toothed member encircling a working chamber,
    an externally-toothed member having a lesser number of teeth than said internally-toothed member and disposed eccentrically thereto in meshing engagement therewith inside said chamber,
    a pair of fluid inlet and outlet flow-controlling elements connected unitarily to opposite ends of said internally-toothed member and having circumferentially-spaced longitudinal fluid pasageways therein communicating with the periphery of said chamber between the teeth of said internally-toothed member.
    hollow fluid inlet and outlet shafts adapted to be connected to pressure fluid supply and discharge means and having fluid inlet and outlet passageways therein communicating successively with said longitudinal fluid inlet and outlet passageways respectively,
        one of said members being movable in an orbit about the axis of the other member for effecting relative rotation between said members and between said elements and said shafts in response to the flow of pressure fluid through said passageways,
    and means drivingly connecting said externally-toothed member to said shafts for preventing relative rotation therebetween while permitting oscillation of said externally-toothed member relatively to said shafts.
2. An orbital gear-rotor motor, according to claim 1, wherein said passageways of said elements and said shafts have approximately radial portions registering momentarily with one another upon relative rotation therebetween.
3. An orbital gear-rotor motor, according to claim 1, wherein means is provided for holding said shafts stationary while permitting rotation of said elements and said internally-toothed member relatively to said shafts.
4. An orbital gear-rotor motor, according to claim 1, wherein said drivingly-connecting means comprises at least one double-headed toothed link and internally-toothed bores in said externally-toothed member and in one of said shafts with the toothed heads of said link meshing with said internally-toothed bores.
5. An orbital gear-rotor motor, according to claim 1, wherein said externally-toothed member and said shafts have internally-toothed bores therein and wherein a pair of links at their inner ends have toothed inner heads meshing with the internally-toothed bore of said externally-toothed member and at their outer ends have toothed outer heads meshing with the internally-toothed bores of said shafts.

6. An orbital gear rotor motor, according to claim 1, wherein said elements and said internally-toothed member have substantially continuous external surfaces extending therealong and collectively constituting a driving barrel.

7. An orbital gear-rotor motor, according to claim 6, wherein end closures are secured to said barrel at the opposite ends thereof and have central bores therein receiving the outer end portions of said shafts.

8. An orbital gear-rotor motor, according to claim 1, wherein said shafts have enlarged diameter portions disposed within said elements and have internally-toothed bores therein drivingly connected by said means to said externally-toothed member for relative oscillation of said externally-toothed member without relative rotation therebetween.

9. An orbital gear-rotor motor, according to claim 1, wherein said passageways of said elements are of the same number as the internal teeth of said internally-toothed member, and wherein the outlet passageways of the outlet shaft are disposed in circumferentially-offset relationship to the inlet pasageways of the inlet shaft.

10. An orbital gear-rotor motor, according to claim 7, wherein said end closures, said elements and said internally-toothed member have aligned fastener holes disposed in circumferentially-spaced relationship intermediate said longitudinal pasageways of said elements, and wherein fasteners securing said end closures, said elements and said internally-toothed member to one another are disposed in said fastener holes.

References Cited
UNITED STATES PATENTS

| | | | |
|---|---|---|---|
| Re. 26,383 | 4/1968 | Huber | 91—56 |
| 1,341,846 | 6/1920 | Gollings | 91—68 |
| 1,969,651 | 8/1934 | Kretschmer | 103—131 |
| 2,384,872 | 9/1945 | Baker et al. | 103—126(L) |
| 2,989,951 | 6/1961 | Charlson | 103—131 |
| 3,270,683 | 9/1966 | McDermott | 103—130 |
| 3,383,931 | 5/1968 | Patterson, Jr. | 91—56 |
| 3,391,608 | 7/1968 | Huber | 91—56 |

MARK NEWMAN, Primary Examiner

W. J. GOODLIN, Assistant Exmainer